United States Patent Office 3,367,974
Patented Feb. 6, 1968

3,367,974
PROCESS FOR THE PREPARATION OF
DINUCLEAR HALOPHENOLS
Francis N. Apel, Nutley, and Louis B. Conte, Jr., Newark,
N.J., assignors to Union Carbide Corporation, a corporation of New York
No Drawing. Filed June 4, 1965, Ser. No. 461,508
4 Claims. (Cl. 260—607)

ABSTRACT OF THE DISCLOSURE

Dinuclear halophenols are prepared by reacting a dihalo dinuclear compound and water in the vapor phase in the presence of a hydrolysis promoting catalyst.

---

This invention relates to the preparation of dinuclear aromatic compounds having a halogen atom and a hydroxyl group each bonded to aromatic carbon atoms of different aromatic rings. More particularly, this invention relates to the preparation of 4-chloro-4'-hydroxydiphenyl sulfone.

Dinuclear halophenols such as 4-chloro-4'-hydroxydiphenyl sulfone are important monomeric materials from which polyarylene polyethers can be prepared by the self-condensation of the alkali metal monosalt of such dinuclear halophenols in the presence of specific liquid organic sulfoxides or sulfone reaction solvents under substantially anhydrous conditions. Polyarylene polyethers prepared in this manner exhibit excellent physical, mechanical, thermal, chemical and electrical properties and can be melt fabricated into a wide variety of useful articles.

Heretofore dinuclear halophenols such as 4-chloro-4'-hydroxydiphenyl sulfone have been prepared by a Friedel-Crafts reaction wherein paramethoxybenzenesulfonyl chloride is reacted with chlorobenzene and aluminum chloride to produce 4-chloro-4'-methoxydiphenyl sulfone which is subsequently converted to 4-chloro-4'-hydroxydiphenyl sulfone by ether cleavage with hydriodic acid. Szmant et al., JACS, 78, 3400–03 (1956).

The Friedel-Crafts reaction, however, suffers from several drawbacks. For instance, sulfonyl chlorides are toxic and corrosive and anhydrous conditions are required. Furthermore, the aluminum chloride must be removed by neutralization and washing and is not reusable. Hydrolysis of the ether is slow and requires extremely concentrated hydriodic acid. Moreover, low overall yields are secured.

It has now been discovered that these dinuclear halophenols can be prepared directly from the corresponding dihalo compound in a manner which overcomes the drawbacks met with the Friedel-Crafts preparation.

Broadly, dinuclear halophenols are prepared according to the present invention by reacting in the vapor phase water and a compound having the formula

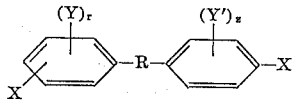

wherein X is fluorine or chlorine, Y and Y' can be the same or different and are alkyl groups having from 1 to 4 carbon atoms inclusive, r and z are integers having a value of from 0 to 4 inclusive, and R represents a divalent connecting radical such as the carbonyl radical —CO—, the ether radical —O—, the sulfone radical —SO$_2$—, and the saturated fluorocarbon radical —CF$_2$CF$_2$—. The molar ratio of the above compound to water can vary from about 1:10 to about 1:50. For purposes of this invention, it is preferred to reach such compounds wherein each X is in the para position with respect to R.

It was quite surprising to discover that these dihalocompounds can be converted to the corresponding dinuclear halophenol without forming any products of disproportionation because similar compounds such as 2,2'-bis(4 - chlorophenyl)propane and 4,4' - dichlorodiphenyl sulfide undergo disproportionation under the conditions of the process of this invention.

Examples of suitable dihalo dinuclear compounds include di(halophenyl)sulfones such as bis - (4 - chlorophenyl)sulfone, 2,4' - dichlorodiphenyl sulfone, 3,4'-difluorodiphenyl sulfone, and the like; di(halophenyl)ethers such as bis-(4-chlorophenyl)ether, the 4,3'-, 4,2'-dichlorodiphenyl ethers, 4,4'-difluoro-2,6-dimethyldiphenyl ether, bis - (4-chloro-3-isobutylphenyl)ether, bis-(4-fluoro-3-isopropylphenyl)ether, 4,4' - dichloro-3,6-dimethyldiphenylether, and the like; dihalobenzophenones such as 4,4'-difluorobenzophenone, 3,4'-difluorobenzophenone, 4,4'-dichlorobenzophenone, 2,4' - dichloro-benzophenone, 2,4'-difluoro - 3,3'-dimethylbenzophenone, 3,4'-dichloro-2,2'-diethylbenzophenone, and the like; and the 1,2-bis(halophenyl)fluoroethanes such as 1,2 - bis-(4-fluorophenyl) tetrafluoroethane, 1,2 - bis - (4-chlorophenyl)tetrafluoroethane, 1,2 - bis - (3 - methyl-4-chlorophenyl)tetrafluoroethane, 1,2 - bis-(2-ethyl-4-fluorophenyl)tetrafluoroethane, and the like.

The process of this invention is generally carried out at temperatures ranging from about 350° C. to about 450° C. and preferably from about 375° C. to about 425° C. Since the reaction is carried out in the vapor phase, pressures higher than about atmospheric are not normally employed. If desired however, pressures ranging from about 1 p.s.i.g. to about 50 p.s.i.g. can be used provided sufficient heat is applied to the system to maintain the reactants in the vapor phase.

The catalysts used in the process of this invention are halogenated benzenoid hydrocarbon hydrolysis promoting catalysts, such as those employed in the Raschig process for producing phenol from chlorobenzene. Such catalysts generally comprise polyvalent metal salts, particularly phosphates of metals of Groups I–B and II–A of the Deming Periodic Table of the Elements, Handbook of Chemistry and Physics, 30th ed., p. 312, especially phosphates of calcium and copper. A preferred catalyst is a porous pelletized mixture of calcium phosphate and copper phosphate.

In carrying out the process of this invention the molar ratio of the dihalo dinuclear aromatic compound to water can vary from about 1:10 to about 1:50 and preferably from about 1:20 to about 1:30.

The process of this invention is carried out generally by passing water and a dihalo dinuclear aromatic compound in the desired amounts through a hydrolysis zone such as cylindrical tube or a plurality of such tubes packed with catalyst at a temperature of from about 350° C. to about 450° C., condensing the vaporous effluent from the hydrolysis and recovering dinuclear halophenol by conventional techniques.

The following examples are intended to further illustrate this invention without limiting the same in any manner.

EXAMPLE 1

Superheated steam at the temperature of the catalyst and 4,4'-dichlorodiphenyl sulfone dissolved in phenol were passed through a stainless steel column 4 inches in diameter and 2 feet long packed with one-quarter inch pellets of porous catalyst comprising a mixture of a major portion of calcium phosphate and a minor portion of copper phosphate in three separate runs under the following conditions.

| | | | |
|---|---|---|---|
| Catalyst Weight, lbs | 0.512 | 3.09 | 3.09 |
| Steam Flow, lbs. water/hour | 1.0 | 0.61 | 0.61 |
| Sulfone/phenol Flow, lbs./hour | 1.0 | 0.94 | 0.94 |
| Catalyst Temperature, °C | 350 | 450 | 375 |
| Catalyst Factor, hours | 0.256 | 2 | 2 |
| Molar Ratio of Sulfone:Water | 1:31.8 | 1:20 | 1:20 |

Catalyst factor refers to reactor retention time and is defined as the pounds of dry catalyst per pounds per hour of reactor feed. The vaporous effluent from each run was condensed and the phenol removed by distillation. The residue was dissolved in benzene, extracted with 10% aqueous NaOH and the aqueous solution separated and acidified with HCl. The precipitated product was purified by recrystallization from methanol-water. The product from each run was crystalline, had a melting point of 145°–146.5° C. and had the formula

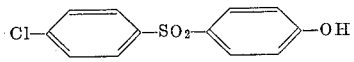

EXAMPLE 2

Example 1 is duplicated using 3,4'-difluorodiphenyl sulfone in place of 4,4'-dichlorodiphenyl sulfone to form the corresponding fluorophenol.

EXAMPLE 3

Example 1 is duplicated using bis-(4-chlorophenyl) ether in place of 4,4'-dichlorodiphenyl sulfone to form the corresponding chlorophenol.

EXAMPLE 4

Example 1 is duplicated using bis-(4-fluoro-3-isopropylphenyl)ether in place of 4,4'-dichlorodiphenyl sulfone to form the corresponding fluorophenol.

EXAMPLE 5

Example 1 is duplicated using 4,4'-difluorobenzophenone in place of 4,4'-dichlorodiphenyl sulfone to form the corresponding fluorophenol.

EXAMPLE 6

Example 1 is duplicated using 3,4'-dichloro-2,2'-diethylbenzophenone in place of 4,4'-dichlorodiphenyl sulfone to form the corresponding chlorophenol.

EXAMPLE 7

Example 1 is duplicated using 1,2-bis-(4-chlorophenyl)-tetrafluoroethane in place of 4,4'-dichlorodiphenyl sulfone to form the corresponding chlorophenol.

We claim:

1. Process for preparing dinuclear halophenols wherein the halo is herein defined, which comprises reacting in the vapor phase at a temperature of about 350° C. to about 450° C. water and a compound having the formula

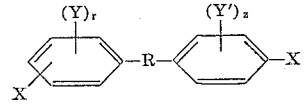

wherein each X represents a halo atom selected from the group of fluorine and chlorine, Y and Y' each represent alkyl groups having from 1 to 4 carbon atoms inclusive, $r$ and $z$ are integers having a value of from 0 to 4 inclusive, and R represents a divalent connecting radical selected from the group of —CO—, —O—, —SO$_2$—, and —CF$_2$CF$_2$— in the presence of a hydrolysis promoting polyvalent metal salt catalyst, and wherein the molar ratio of said compound to water is from about 1:10 to about 1:50.

2. Process of claim 1 wherein each X is in the para position with respect to R.

3. Process of claim 1 wherein said compound is 4,4'-dichlorodiphenyl sulfone.

4. Process of claim 1 wherein said catalyst comprises a major portion of calcium phosphate and a minor portion of copper phosphate.

References Cited

UNITED STATES PATENTS 2,988,573   6/1961   Siebentritt et al. _____ 260—629

JOSEPH P. BRUST, *Primary Examiner.*

D. R. PHILLIPS, *Assistant Examiner.*